Sept. 12, 1972   R. M. AMADON ET AL   3,690,895
PROCESS FOR PREPARING FOLDED FOOD CHIPS
Filed Sept. 5, 1969   2 Sheets-Sheet 1
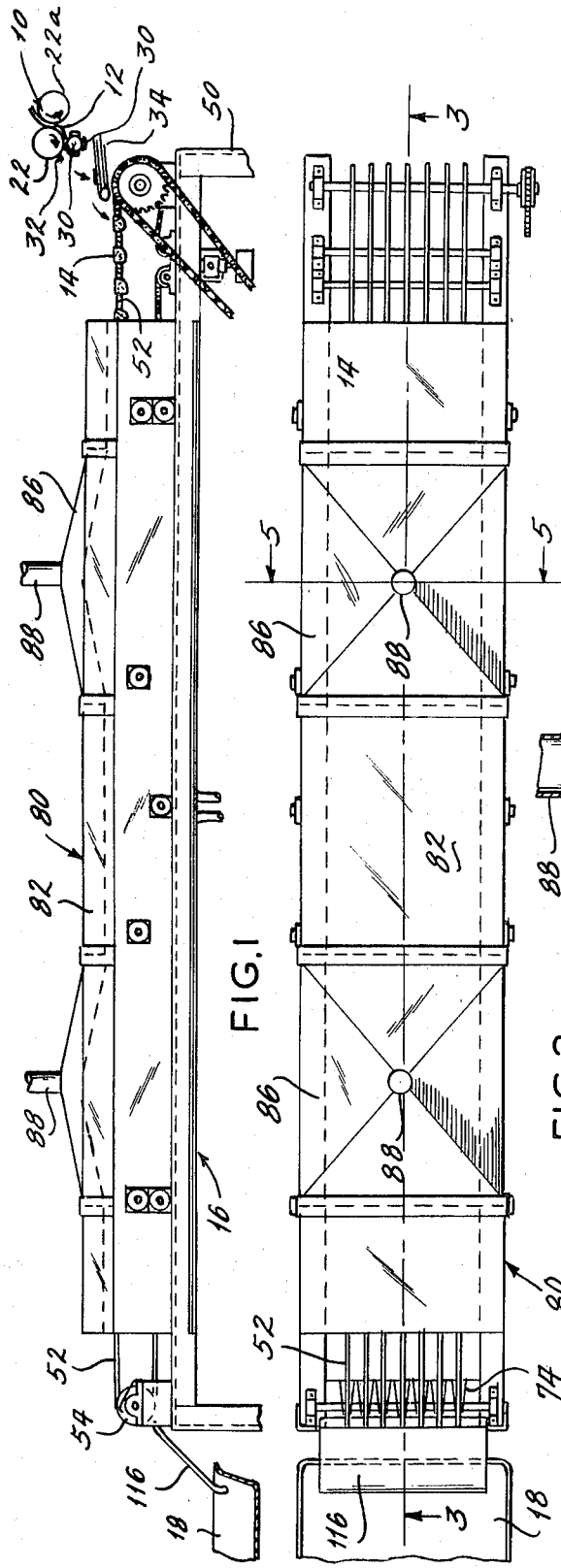
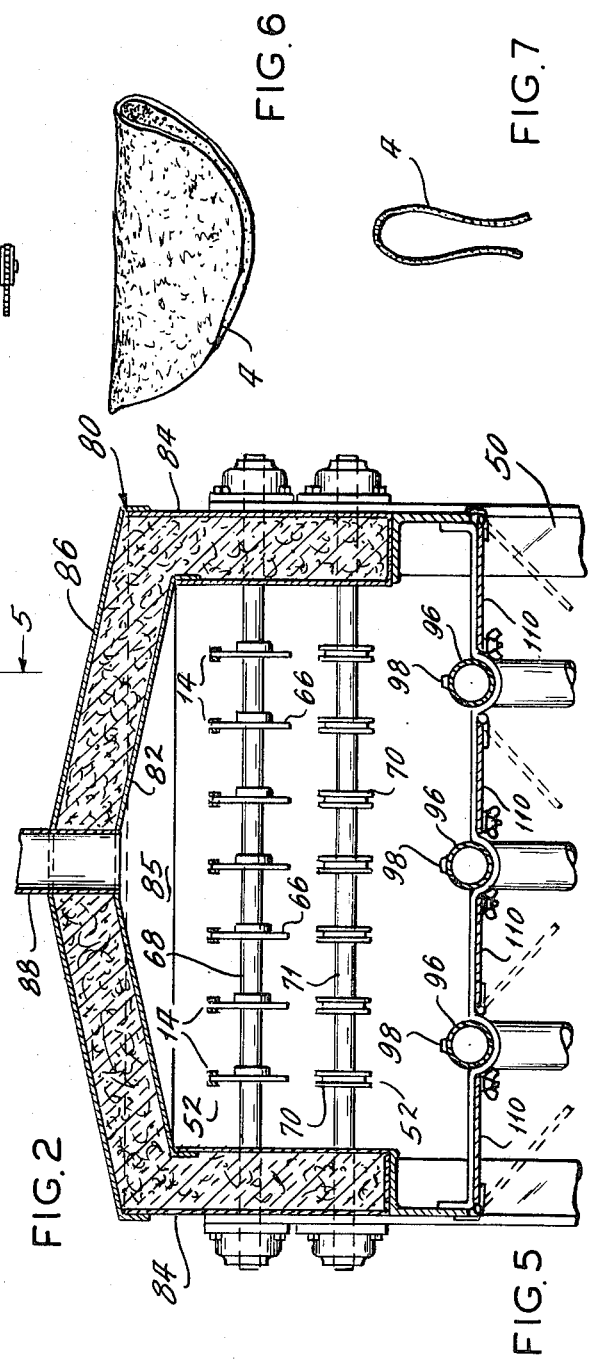
INVENTORS:
ROGER M. AMADON
MORRIS G. BOREN
BY Gravely, Lieder & Woodruff
ATTORNEYS Sept. 12, 1972   R. M. AMADON ET AL   3,690,895
PROCESS FOR PREPARING FOLDED FOOD CHIPS
Filed Sept. 5, 1969   2 Sheets-Sheet 2

INVENTORS:
ROGER M. AMADON
MORRIS G. BOREN
BY Gravely, Lieder, & Woodruff
ATTORNEYS.

United States Patent Office 3,690,895
Patented Sept. 12, 1972

3,690,895
PROCESS FOR PREPARING FOLDED FOOD CHIPS
Roger M. Amadon, Greenville, Ill., and Morris G. Boren, St. Louis, Mo., assignors to Pet Incorporated, St. Louis, Mo.
Filed Sept. 5, 1969, Ser. No. 855,690
Int. Cl. A23l 1/10, 1/12
U.S. Cl. 99—80 R           4 Claims

ABSTRACT OF THE DISCLOSURE

Discrete segments are cut from a sheet of dough and deposited on an endless conveyor chain such that they drape downwardly across the sides of the chain and assume a folding configuration. The segments are heated while on the chain to reduce their moisture content and are thereafter dislodged from the chain and introduced into a frying vat where they are converted into food chips.

BACKGROUND OF THE INVENTION

This invention relates in general to food preparation and, more particularly, to an apparatus and a process for preparing folded food chips.

While conventional chip making machinery is suitable for producing generally wavy potato and corn chips, no process or machinery has heretofore been devised for forming folded chips on a mass production basis. These chips have a distinctive U-shaped configuration, resembling that of a miniature taco, and this configuration not only enhances the appearance and marketability of the chip product, but also renders the chip product less susceptible to crumbling.

SUMMARY OF THE INVENTION

One of the principal objects of the present invention is to provide a process and an apparatus for manufacturing taco-shaped food chips on a mass production basis. Another object is to provide an apparatus of the type stated which is simple in construction and operation and highly compact. A further object is to provide a process of the type stated which is simple and does not require skilled personnel for its successful operation. A further object is to provide a process and an apparatus for producing a chip which is attractive in appearance and resists crumbling. These and other objects and advantages will become apparent hereinafter.

The present invention resides in a process for forming folded food chips by depositing dough segments on a conveying member so that the segments drape downwardly along the sides of the member and assume a folded configuration. The segments are dried while on the conveying member. The invention further resides in an apparatus for performing the foregoing process. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a side elevational view of a chip preparing apparatus constructed in accordance with and embodying the present invention with the cutting apparatus shown schematically;

FIG. 2 is a top plan view of the chip drying apparatus;

FIG. 5 is a sectional view taken along line 5—5 of FIG. 2; and

FIGS. 6 and 7 are side and end elevational views, respectively, of the folded chip formed by the apparatus illustrated in FIGS. 1–5.

DETAILED DESCRIPTION

Figure 4:
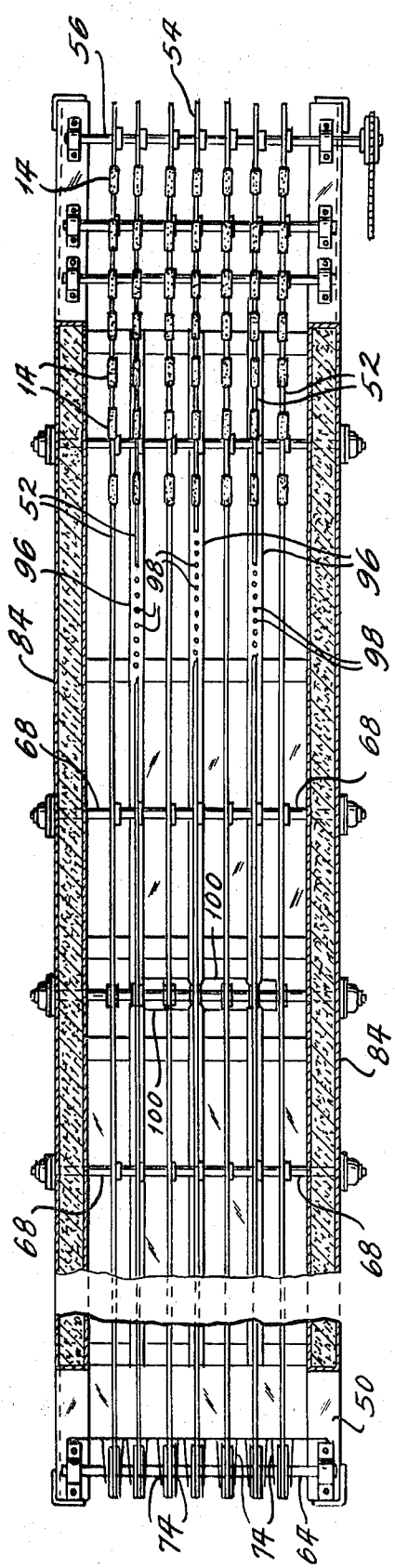
FIG. 4 is a sectional view taken along line 4—4 of FIG. 3.

Referring now in detail to the drawings, 2 designates an apparatus for preparing folded chips 4 (FIGS. 6 and 7) from dough 6 which is prepared in the conventional manner, preferably from corn meal. Broadly speaking, the apparatus 2 includes a dough cutter 10 which flattens a mass of dough into a sheet 12 and cuts discrete circular segments 14 from the sheet 12, an oven 16 which converts the circular segments 14 into a folded or U-shaped configuration and further dries them, and a frying vat 18 in which the folded and dried segments 14 are fried. The end result at the termination of the frying operation is the chips 4.

Turning now to FIGS. 1 and 2, the dough cutter 10 includes a pair of rolls 22 and 22a into which the dough is fed as a continuous mass. The rolls 22 and 22a flatten and spread the dough into the sheet 12 of the desired thickness. The leading roll 22 is engaged by circular cutting edges 28 formed axially at spaced intervals on a cutting roll 30 for cutting the circular segments 14 from the sheet 12. The circular segments 14 adhere to the leading roll 22 and are dislodged therefrom by a thin wire 32. The circular segments 14, once they are dislodged, drop onto a belt conveyor 34, and the remaining portion of the sheet 12 is carried around by the roll 22 and is collected for reintroduction between the rolls 22 and 22a. The conveyor 34 extends into the oven 16 where it discharges the circular segments 14 in a plurality of transversely spaced rows for subsequent processing. The dough cutter 10 is a conventional item of commerce and other apparatus for cutting suitable dough segments may be substituted therefor.

Figure 3:
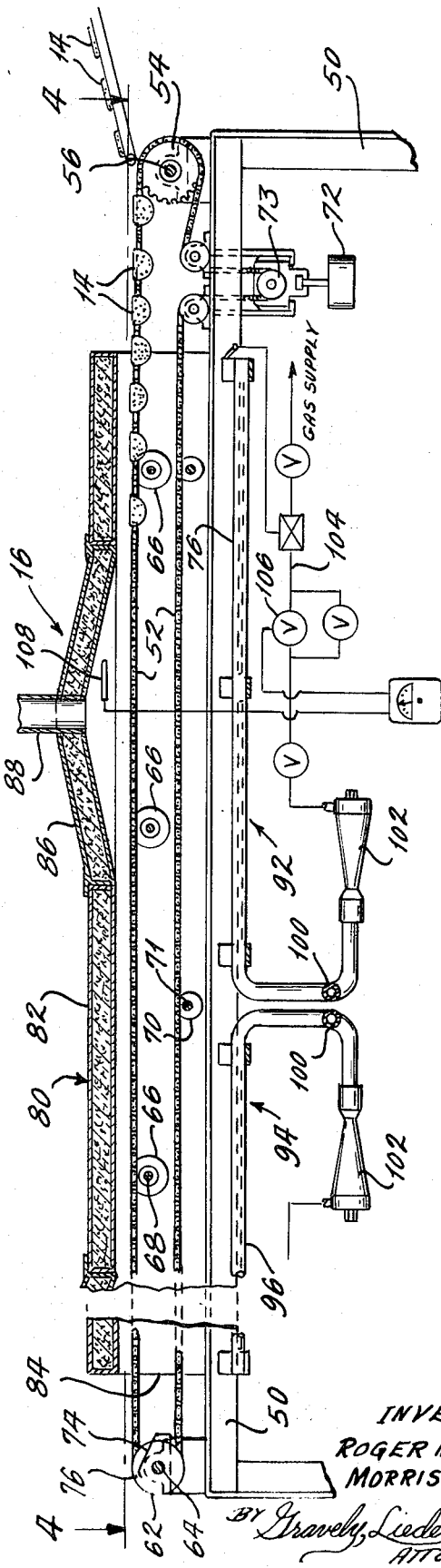
FIG. 3 is a longitudinal sectional view of the chip forming oven which forms part of the present invention.

The oven 16 (FIGS. 3–5) includes a frame 50 which supports a plurality of conveyor chains 52 in side-by-side relation. The chains 52 are driven at the same speed through drive sprockets 54 mounted on a common drive shaft 56 located at the end of the frame 50 at which the belt conveyor 34 terminates. The shaft 56, in turn, is coupled to a variable speed drive motor (not shown) through a gear box (not shown) or other suitable speed reduction unit. The construction of the variable speed motor, the gear box, and the drive sprockets 54 are all such that the speed of the chains 52 can be varied between 20 and 60 feet per minute. The opposite ends of the chains 52 are trained around idler wheels 62 mounted on an end shaft 64 which is journaled in the opposite end of the frame 50. The upper passes of the chains 52 move from the sprockets 54 to the idler wheels 62 and are prevented from sagging appreciably by intermediate supporting sprockets 66 mounted on common idler shafts 68 which are spaced along the frame 50 between the drive shaft 56 and the end shaft 64. The lower passes of the chains 52 are similarly supported on intermediate wheels 70 mounted on common idler shafts 71 which are journaled in the frame 50 below the idler shafts 68 to which the sprockets 66 are secured. The chains 52 are maintained taut by weights 72 supported on downwardly looped portions of their lower passes by means of sprockets 73.

The belt conveyor 34 leading from the dough cutter 10 terminates above the in-feed ends of the conveyor chains 52, that is, the ends of the drive sprockets 54, and the spacing between the chains 52 corresponds to the spacing between the circular cutting edges 28 on the cutting roll 30 so that circular segments 14 will align with and slide onto the chains 52 as they are discharged from the belt conveyor 34.

Adjacent to each idler wheel 62 a spring wire ejecting clip 74 projects along the terminal portion of the upper pass on the conveyor chain 52 trained over that wheel 62. The clip 74 terminates at a hooked end portion 76 located at the chain 52 before the chain 52 turns under and commences the return pass, so that anything resting on the upper pass of the chain 52 will be dislodged as the chain 52 passes over its idler wheel 62.

The frame 50 further carries a hood 80 having a roof 82 located above the conveyor chains 52 and a pair of side walls 84 which extend downwardly along the sides of the two outermost chains 52 (FIG. 5). The ends of the hood 80 are open so that the upper passes of the chains 52 are, in effect, disposed within a tunnel 85. The roof 82 is provided with a pair of pyramidal sections 86 which terminate at vent stacks 88.

Beneath the lower passes of the conveyor chains 52 a burner assembly 90 (FIGS. 3-5) is supported on the frame 50, and it includes two sections 92 and 94 each comprising several longitudinally extending burner pipes 96 provided with upwardly opening flame orifices 98. The pipes 96 of each section 92 and 94 are connected to a separate header 100 and each header 100 is supplied with natural or some other combustible gas through a gas line 102 which passes through a mixing unit 104 for mixing the gas with air in the conventional manner. Each gas line 104 (FIG. 3) has a valve 106 which is responsive to a temperature probe 108 located adjacent to the burner section 92 or 94 associated with the particular valve 106.

Beneath the burner assembly 90, the bottom of the tunnel 85 is closed by a set of doors 110 which are hinged to the frame 50 so that they can be swung downwardly to facilitate cleaning.

The discharge end of the oven 16 is disposed above a chute 116 which receives the dried and folded chip segments 14, and the discharge end of the chute 116 is, in turn, located above the frying vat 18 for introducing those segments 14 into the hot cooking oil within the vat 18.

OPERATION

In operation the mass of dough is fed between the rolls 22 and 22a which convert it into the flat sheet 12 of dough. As the sheet 12 passes over the leading roll 22 the circular cutting edges 28 of the cutting roll 30 cut the circular segments 14 from it. The segments 14 adhere to the leading roll 26 and are dislodged therefrom by the wire 32. The dislodged segments 14 drop onto the belt conveyor 34. Since the circular cutting edges 28 are spread axially across the cutting roll 30, the succession of circular segments 14 cut from the sheet 12 creates a plurality of transversely spaced rows on the belt conveyor 34. These segments 14 are, furthermore, deposited such that each row aligns with a conveyor chain 52 in the oven 16.

When the circular segments 14 reach the end of the conveyor 34, they slide downwardly onto the chains 52, and inasmuch as the diameter of each circular segment 14 exceeds the width of the chain 52 onto which it is deposited by a substantial amount, the segment 14 will tend to drape over the chain 52 in a folded configuration which resembles a taco. The chains 52 convey the segments 14 through the heated interior of the oven 16 where the dough of the segments 14 loses a substantial portion of its water content. The heat is, of course, supplied by the burner assembly 90 located in the bottom of the oven 16, and since the burner assembly 90 comprises two burner sections 92 and 94, each of which is independently controlled by a separate valve 106, two-zone temperature control is afforded.

When the folded segments 14 reach the end of the upper passes on the conveyor chains 52, they pass over the idler wheels 62 at which point they are engaged by the ejecting clips 74 and dislodged from the chains 52. The dried and folded segments 14 which have been so dislodged fall downwardly onto the chute 116 which conveys them to the frying vat 18 wherein the segments 14 are converted into the chips 4.

Normally, the oven 16 should be maintained between about 700° F. and about 800° F., preferably about 750° F. The speed of the chains 52 should be adjusted so that each folded segment 14 remains in the oven 16 between about 20 and about 40 seconds, preferably about 30 seconds. The dough as it enters the oven 16 contains between about 40% and about 60% moisture. As the chips leave the oven 16, they contain between about 10% to about 15% moisture. After fat frying in the vat 18, the chips contain about 1% to about 3% moisture.

Example

Corn meal dough was prepared by adding 12.5 pounds of boiling water containing 30 grams of lime to 10 pounds of yellow corn. The mixture was then maintained at a gentle boil for 20 minutes with occasional stirring during this period. Thereafter, the liquid portion of the mixture was decanted, and the corn was covered with fresh cool water. The mixture so formed was stirred thoroughly and then left to stand overnight. Next, the corn was washed three times and drained, and after the third wash it weighed 15.8 to 16.0 pounds. The washed corn was then introduced into a stone mill, 1.5 pounds of water being added during milling. The ground corn was then transferred to a mixer where 16 grams of spice suspended in 8 to 12 ounces of water were added.

Corn meal dough of the foregoing composition was formed into a sheet 12 at the rolls 22 and each circular dough segment 14 cut from the sheet 12 by the cutting roll 30 was 2¼ inches in diameter and weighed between 2.10 and 2.15 grams. The temperature of the oven 16 was adjusted to 750° F., and the drive motor for the chain 52 was set so that each circular segment 14 deposited onto the chain 52 remained in the oven 30 seconds. The folded and dried segments 14 dislodged from the conveyor chains 52 at the guide clips 74 weighed between 1.55 and 1.57 grams each. These folded and dried segments 14 where then introduced into the cooking oil within the frying vat 18 by means of the chute 116, and after deep frying for 30 seconds, the chips 4 were removed, drained of excess oil, and salted. The chips 4 removed from the vat 18 had a folded configuration resembling a taco and possessed characteristics of corn chips and other chip products.

It should be understood that the dough segments 14 need not be circular in configuration, but may possess any configuration which has sufficient body and width to enable it to be looped over and retained on the chains 52. Furthermore, the dough 6 need not be of a corn meal consistency, but may be any other dough suitable for use in chip preparation processes.

This invention is intended to cover all changes and modifications of the example of the invention herein chosen for purposes of the disclosure which do not constitute departures from the spirit and scope of the invention.

What is claimed is:

1. A process for preparing food chips, said process being continuous and comprising: cutting a mass of dough into a plurality of thin discrete dough segments which are generally disk-shaped, successively folding the disk-shaped dough segments substantially in half so that each dough segment has a fold extending through it and has spaced apart sides of substantially equal area on each side of the fold; contemporaneously with the initiation of the fold and thereafter supporting each dough segment along its fold and between its sides so that after the creation of the fold the sides of the folded dough segment drape downwardly from the line of support along the fold; advancing the folded dough segments in succession and in the direction the folds extend as they are supported along their folds and with the folds of succeeding dough segments longitudinally aligned with the folds of preceding dough segments; heating the folded dough segments as they are advanced at a temperature and for a period of time sufficient to appreciably reduce the moisture content of said segments; freeing said folded dough segments of support along their folds as they reach a predetermined point along their line of advance so that the dough segments are freed from their means of support one after the other; and thereafter frying the folded dough segments.

2. A process according to claim 1 wherein the steps of folding and supporting the dough segments along their folds comprise: depositing the dough segments successively on an endless conveyor chain having sufficient clearance to its sides to enable the sides of the dough segments to drape downwardly without obstruction whereby the dough segments assume a U-shaped configuration.

3. A process according to claim 1 wherein the folded dough segments are heated at between approximately 700° F. and 800° F. for approximately 20 to 40 seconds.

4. A process according to claim 1 wherein the discrete dough segments cut from the mass of dough are circular.

References Cited

UNITED STATES PATENTS

| | | | |
|---|---|---|---|
| 3,149,978 | 9/1964 | Anderson et al. | 99—80 |
| 3,328,174 | 6/1967 | Bassano | 99—85 |
| 2,570,374 | 10/1951 | Pompa | 99—80 R |
| 2,960,045 | 11/1960 | Pentzlin | 107—54 R |
| 3,478,704 | 11/1969 | Ford | 107—55 R |

RAYMOND N. JONES, Primary Examiner

U.S. Cl. X.R.

99—100 P, 404, 443